United States Patent [19]

Larkin et al.

[11] Patent Number: 5,076,637
[45] Date of Patent: Dec. 31, 1991

[54] VEHICLE CAB WINDOW

[75] Inventors: John J. Larkin, Dubuque, Iowa; Gary W. Tindall, Hazel Green, Wis.

[73] Assignee: Deere & Company, Moline, Ill.

[21] Appl. No.: 607,009

[22] Filed: Oct. 31, 1990

[51] Int. Cl.⁵ .............................................. B60J 1/02
[52] U.S. Cl. .................................... 296/190; 296/140; 49/371
[58] Field of Search .................. 296/190, 146; 49/371, 49/351; 180/89.12

[56] References Cited

U.S. PATENT DOCUMENTS

| | | | |
|---|---|---|---|
| 3,963,132 | 6/1976 | Dufour | 296/190 |
| 4,133,574 | 1/1979 | Martin | 296/190 |
| 4,221,274 | 9/1980 | Martin, Jr. | 296/190 |
| 4,518,195 | 5/1985 | Tendall et al. | 296/190 |
| 4,957,324 | 9/1990 | Doescher et al. | 296/190 |

OTHER PUBLICATIONS

Advertising Brochure for John Deere 310C Backhoe-Loader; p. 12, Printed in U.S.A., Nov. 1989.

Primary Examiner—Robert R. Song

[57] ABSTRACT

A backhoe loader has an enclosed cab, the opposite sides of which are essentially formed by large side windows. Each side window is formed by front and rear window panels that are mirror images of one another and are joined at their inner edges by a vertical hinge structure that permits either the front or rear window panel to swing 180° from a closed to an open position, one window panel being closed while the other is fully opened. The hinge structure is formed by a pair of pivots respectively attached to the upper and lower portions of the window frame and a pair of relatively narrow hinge elements swingable on the pivot pins. The window panels have their inner edges secured to their respective hinge elements by an adhesive, and the hinge elements have inner edges that abut one another when both panels are in their closed position, a seal being provided along the inner edge one hinge element and being compressed by the inner edge of the other hinge element when the windows are in their closed condition.

10 Claims, 3 Drawing Sheets 5,076,637

VEHICLE CAB WINDOW

BACKGROUND OF THE INVENTION

This invention relates to a cab for a work vehicle, such as a machine known as a backhoe loader, and more particularly to an improved side window for such a cab.

A backhoe loader is a construction machine that essentially consists of a tractor having a rearward operator station and a loader mounted on the front end of the tractor and a backhoe mounted on the rear of the tractor. The operator station conventionally includes a seat that is reversible so that it faces forwardly when the vehicle is in transit or when the loader portion of the machine is being operated and faces rearwardly while the backhoe is being operated, the controls for the respective machines being appropriately located for manipulation by the operator in the alternate positions of the seat.

In most modern machines of the above type, the operator station includes a cab that provides a comfortable and safe work environment for the machine operator, the cab conventionally including a frame that provides rollover protection for the operator. Since it is important that the operator have good visibility of the operating equipment, the cabs have conventionally been provided with large windows that essentially provide 360° of visibility, except for the necessary posts that provide support for the doors and the roof. For good ventilation during operation of the machine, it is known to provide for opening of the rear and side windows of the cab. It is further known to provide side windows having front and rear panels, either one of which can be opened at the election of the operator, the front panel of the side window being swingable from a closed position 180° to an open position wherein the outer surface of the front window panel abuts the outer surface of the rear window panel. Alternately, the rear window panel can be swung forwardly 180° from its closed to its open position. Appropriate latches are provided for holding the respective window panels in their closed or open positions.

Heretofore, the hinge structure for pivotally mounting the front and rear panels of the side windows have involved significant structure that has interfered with the lateral visibility from the cab. Also, the front and rear window panels have been bolted to the hinge structure, which entails drilling a number of holes in the glass window panels.

SUMMARY OF THE INVENTION

According to the present invention, there is provided an improved hinge structure for mounting the front and rear window panels of the side windows of such a cab. More specifically, the hinge structure comprises a pair of relatively narrow members attached to the inner edges of the respective front and rear glass panels of the cab side window, the hinged structure being pivotally connected to the top and bottom portions of the side window frame by simple pivots.

An important feature of the invention is the provision of recesses in the hinge structures which receive the inner edges of the window panels and the provision of an adhesive for holding the window panels in said recesses, thereby eliminating the need for fasteners and the drilling of holes in the window panels.

Another feature of the invention resides in the provision of an improved seal between the inner edges of the two hinge elements, the seal being compressed when the window panels are both in their closed positions to seal out dust, wind, and noise.

Still another feature of the invention resides in the provision of side windows that are simple in construction and have few parts and which provide a minimum amount of visual interference for the operator.

DESCRIPTION OF THE PREFERRED EMBODIMENT

Figure 1:
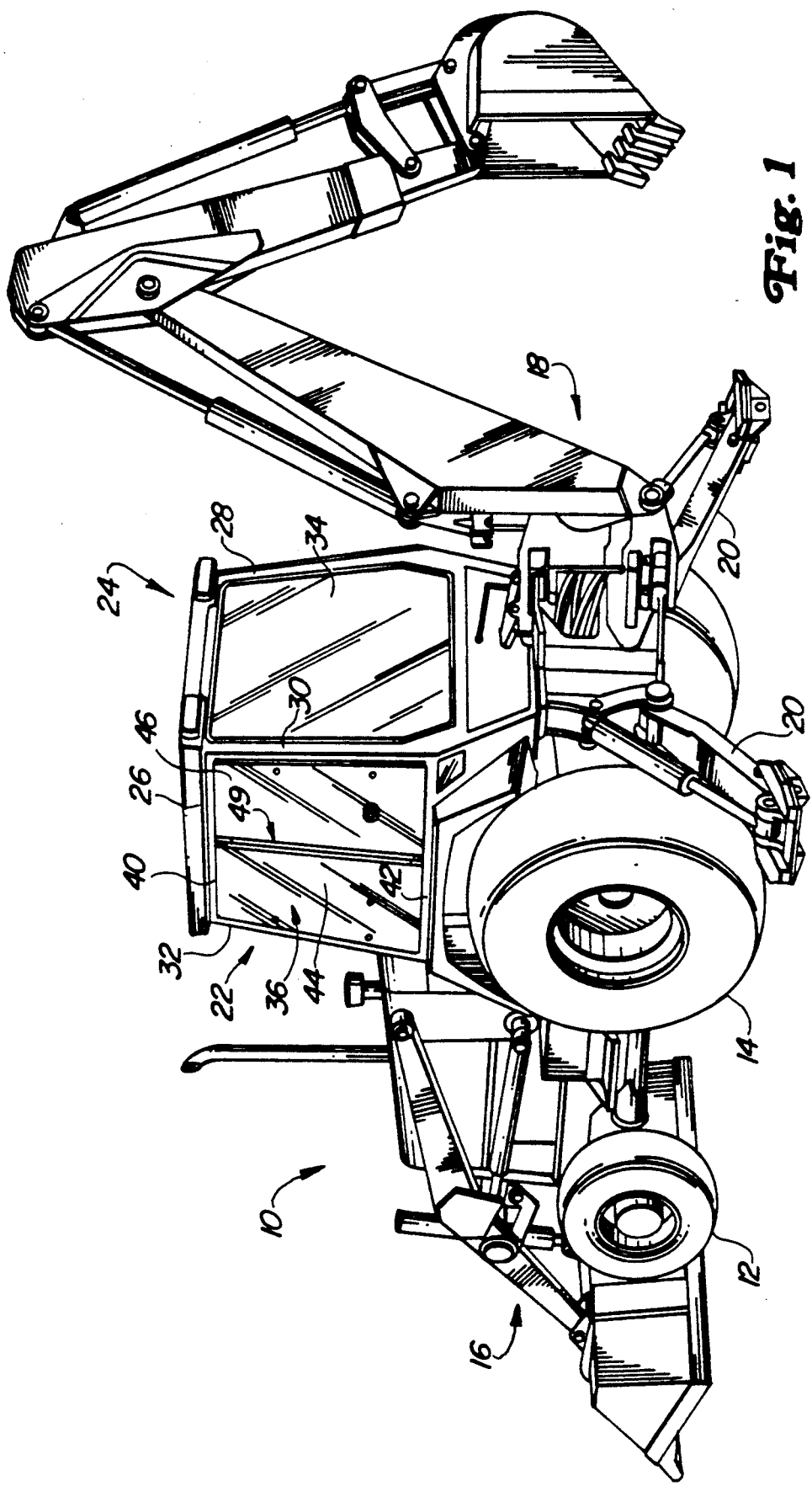
FIG. 1 is a perspective view of a backhoe loader having the improved cab side window.
Figure 3:
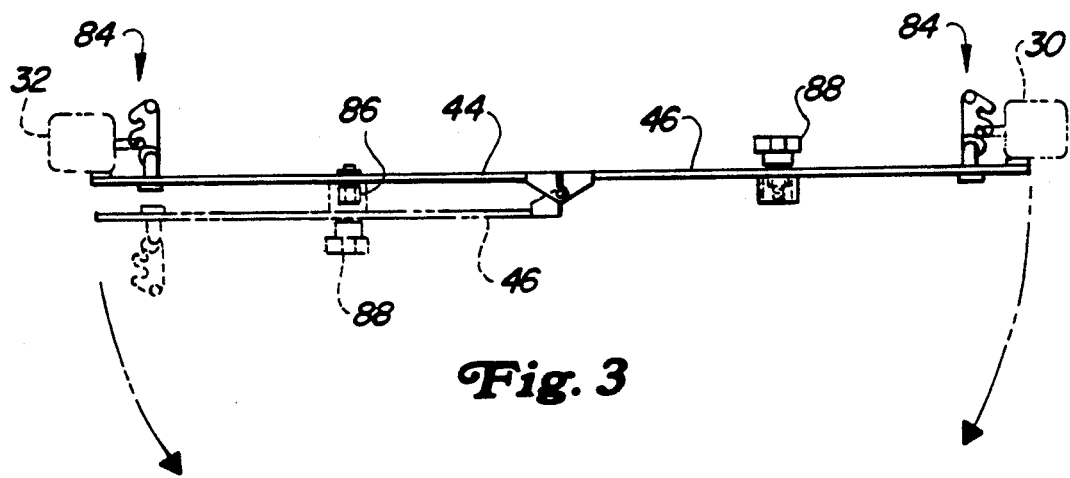
FIG. 3 is a top view of the cab side window shown in a closed condition, with the rear window panel being shown in an open position in phantom lines.

The invention is embodied in a loader backhoe that conventionally includes a main tractor body 10 mounted on steerable front wheels 12 and rear drive wheels 14. The machine includes a forward loader, indicated in its entirety by the numeral 16, and a rearward backhoe, indicated in its entirety by the numeral 18. A pair of stabilizers 20 support the rear end of the machine when the backhoe is in operation. All of the above represents well-known backhoe loader construction.

The tractor body includes an operator station, indicated in its entirety by the numeral 22, at the rear end of the tractor body. As is well known, the controls for both the backhoe and the loader, as well as for the tractor, are located at the operator station, which includes a seat (not shown) that faces forwardly when the machine is in transport or when the loader is being operated and is rotatable 180° to face rearwardly during operation of the backhoe. It is well known to enclose the operator station 22 in an operator enclosure or cab 24. Such cabs on newer machines are conventionally provided with environmental controls and also include integral rollover protection for the operator. The cab includes a horizontal roof 26 above the operator seat and supported on right and left rear posts 28 and 30 and a pair of front posts 32. The four posts support the four corners of the cab roof and provide the rollover protective structure for the operator.

The side walls of such cabs are conventionally provided with glass windows that are made as large as possible to maximize the visibility for the operator. A rear cab window 34 spans the width of the cab and extends downwardly from the cab roof. The construction of the rear window is described in greater detail in U.S. Pat. No. 4,518,195, which is also assigned to the assignee herein. The cab also includes a front windshield and a forward door, neither of which are shown in the drawings. The cab also includes a pair of side windows, indicated generally by the numeral 36, on opposite sides of the cab. The left and right side windows are identical, and only the left side window is shown in the drawings and will be described herein in detail.

The side window covers a major portion of the side of the cab and includes a window frame, indicated generally by the numeral 38. The window frame includes an upper member 40, immediately below the roof, and a lower fore-and-aft member 42 along the top edge of a fender above the rear wheel. The front side of the window frame 38 is disposed along the front post 32 and the rear side of the window frame is formed along the left rear post 30. As is apparent, the front post is inclined upwardly and rearwardly and the rear post is inclined upwardly and forwardly, so that the side window has a generally trapezoidal overall shape.

Figure 2:
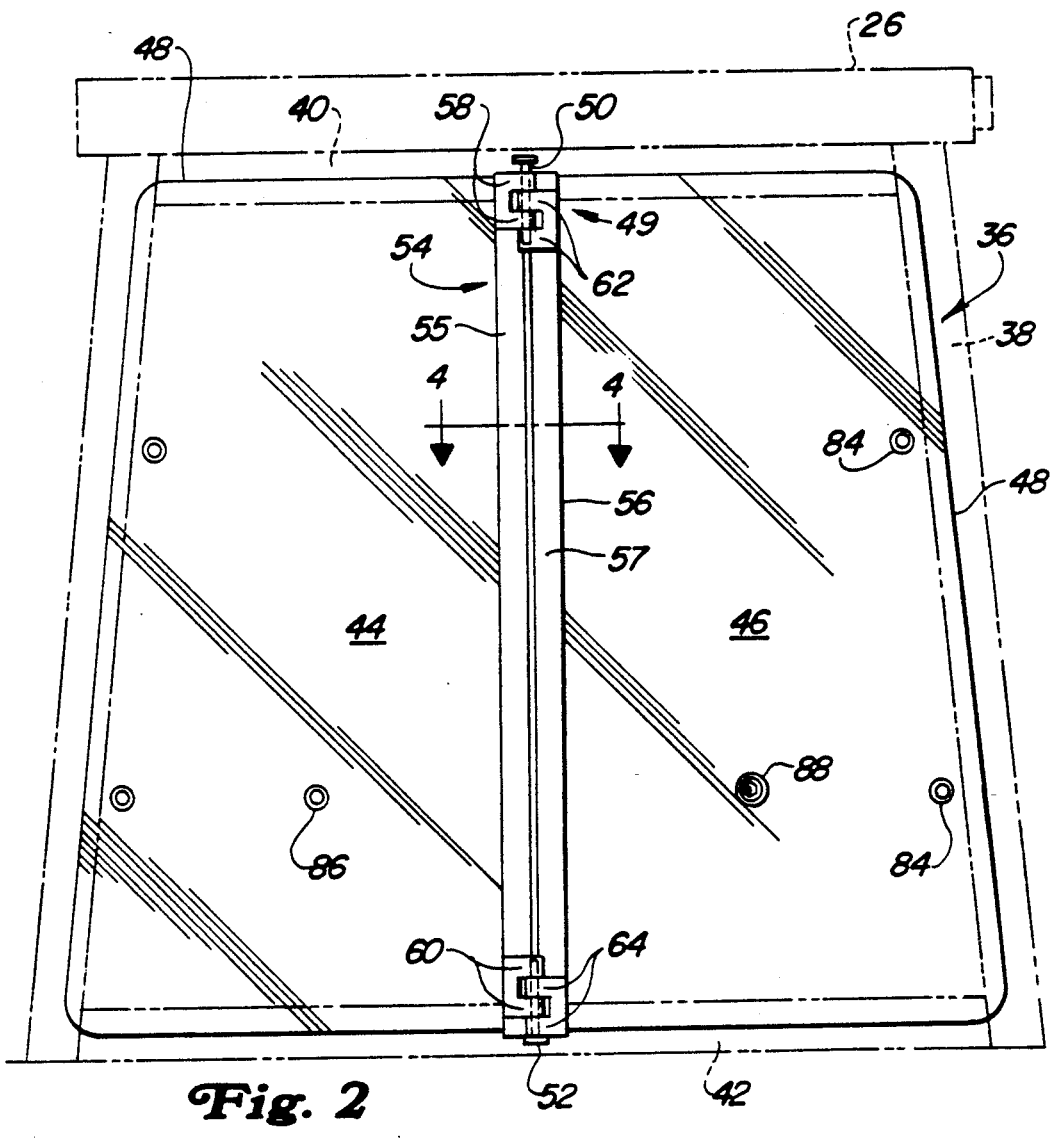
FIG. 2 is a side elevation view of the cab side window.

The side window 36 is formed by front and rear window panels 44 and 46, respectively. The front and rear window panels are essentially mirror images of one another and have adjacent generally vertical inner edges 47 that separate the front and rear window panels 44 and 46 and extend the height of the side window 36. The window panels 44 and 46 have outer edges 48 that form the outer dimensions of the side window 36, and, as is apparent from FIG. 2, the outer edges of the window are slightly larger than the opening formed by the window frame 38. As is well known, appropriate seals (not shown) are provided in the window frame to engage the inner surfaces of the window panels when the panels are in their closed condition, as shown in FIG. 2.

The window panels are connected to each other and to the window frame by a hinge, indicated in its entirety by the numeral 49. The hinge 49 includes an upper pivot pin 50 that is mounted on and extends downwardly from the upper window frame member 40, and a lower pivot pin 52 that is mounted on and extends upwardly from the lower window frame member 42. The hinge 49 also includes a front hinge member 54 that includes an elongated generally upright body 55 that extends the height of the side window. A similar rear hinge member 56 includes an elongated upright body 57 parallel and co-extensive with the front hinge member 54. The front hinge member includes a pair of sockets 58 projecting from the upper end of the hinge body 57 and a pair of lower hinge sockets 60 projecting from the lower end of the hinge member body 55, the upper and lower socket being axially aligned and being adapted to receive the upper and lower pivot pins 50 and 52, respectively. The rear hinge member also includes a pair of upper sockets 62 and a pair of lower sockets 64 that also respectively are mounted on the upper and lower pivot pins 50 and 52. The upper sockets on the rear hinge member are offset slightly from the top of the hinge member so that they overlap the upper sockets on the front hinge member, and similarly the lower sockets on the front hinge member are offset a short distance above the sockets on the rear hinge member so that the lower sockets also overlap, as shown in FIG. 2. The front and rear hinge members 54 and 56 are actually identical, the rear hinge member merely being a flipped over version of the front hinge member.

Figure 4:
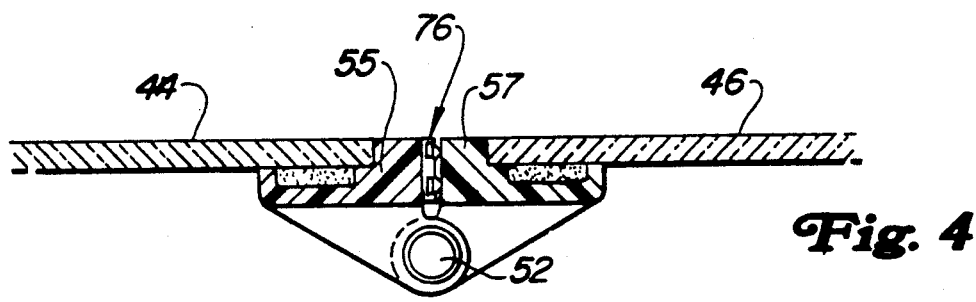
FIG. 4 is a section view of the side window hinge as viewed along the lines 4—4 of FIG. 2.
Figure 5:
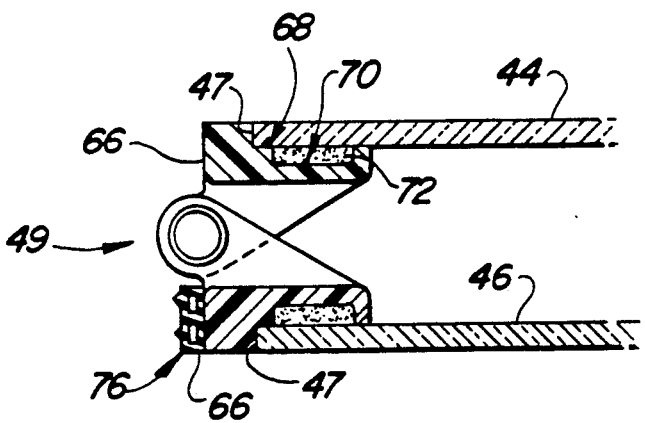
FIG. 5 is a section view similar to FIG. 4 but showing the front window panel swung to its open position.

The detailed construction of the hinge members is best shown in FIGS. 4 and 5. The elongated body of each hinge member has an inner edge or surface 66. The inner surfaces or edges 66 of the respective hinge members are opposite one another when the window panels are in their closed condition, as shown in FIG. 4, and are generally aligned with each other but slightly offset from the axis of the sockets when either window is in its open condition, as shown in FIG. 5. The hinge members are provided with longitudinally extending recesses 68 at the corners opposite the sockets. As shown in FIG. 4, the depth of the recesses is the same as the thickness of the window panels, and the inner ends or edges of the window panels are disposed in the recesses, so that, when the window panels are in their closed condition as shown in FIG. 4, the interior surfaces of the window panels are coplanar with the interior sides of the hinge members. A pocket 70 is provided in the hinge members along one side of each recess 68, extending the length of the hinge member, and an adhesive is provided in the pocket to adhere the window panel to the respective hinge members. The adhesive is a urethane adhesive that is commercially available under the name "Essex No. 57302".

Figure 6:
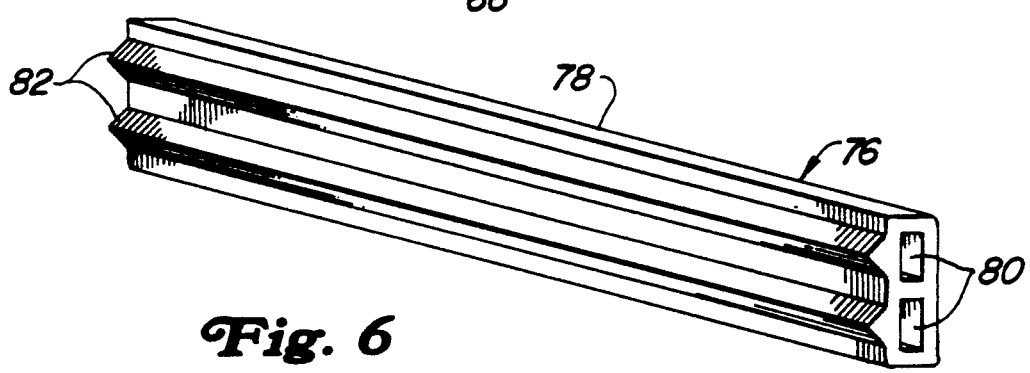
FIG. 6 is a perspective view of the improved seal between the front and rear window panels.

An elongated seal 76 is attached by means of an adhesive to the inner surface 66 of one of the hinge members and extends the entire vertical length of the hinge member. As shown in FIG. 6, the seal includes an elongated body having a rectangular cross section with a pair of rectangular openings or cores 80 that extend the length of the body and accommodate significant compression of the seal. The seal also has a pair of longitudinally extending parallel lips 82 on the opposite side of the seal body from the side adhered to the hinge member. As is apparent, when one window panel is swung from its open position, as shown in FIG. 5, to its closed position, as shown in FIG. 4, the seal is significantly compressed to provide a tight seal between the two window panels.

Either the front window panel 44 or the rear window panel 46 can be swung 180° from its closed condition to an open condition according to the desires of the operator. A pair of latches 84 are provided at the rear edge of the rear window panel to selectively lock the rear window panel to the window frame 38, and a similar pair of latches 84 are provided adjacent the front edge of the front window panel to selectively secure the front window panel to the front side of the window frame 38. The construction of the latches is described in detail in U.S. Pat. No. 4,758,032, also assigned to the assignee herein.

When the window is in its closed condition, as shown in FIG. 4, both sets of latches are locked. When the operator wants to open either the front or the rear window panel, he releases the latches on the selected panel and swings the window panel 180° until it is parallel and opposite to the other window panel, as shown in FIG. 5. A locking device is provided to lock either window in the open position, as shown in FIG. 5, the lock comprising an internally threaded socket 86 mounted on the front window panel and a knob having a threaded portion extending through the window on the rear window panel. The threaded portion of the knob is threadable into the socket 86 when either window is in its open condition.

As is apparent, the above window construction permits the operator to easily and selectively open either the front or the rear half of the side window at his option. As is also apparent, the hinge structure is simple and takes little space, so that it provides minimal interference with the visibility from the operator station.

We claim:

1. In a work vehicle having an operator station including a cab having a generally upright window frame surrounding a window opening, an improved window mounted in the opening and comprising:

upper and lower axially aligned pivot elements respectively mounted on upper and lower portions of the window frame;

first and second vertically elongated hinge element pivotally connected to both the upper and lower pivot elements and having generally vertical inner edges offset from and parallel to the axis of the pivot elements and laterally open recesses extending the length of the hinge elements between the upper and lower window frame portions;

first and second transparent window panels having generally vertical inner edges respectively affixed in the recesses of the first and second hinge elements, the first and second hinge elements and attached window panels being swingable relative to each other about the axis of the pivot elements between an open position, wherein the outer surfaces of the panels are opposite each other, and a closed position wherein the outer surfaces are generally coplanar and the outer edges of the window panels conjunctively conform to and engage the window frame;

and an elastically compressible seal member attached to the inner edge of one hinge element and engageable with and compressed by the inner edge of the other hinge element when the window panels and hinge elements are in the closed position.

2. The invention defined in claim 1 wherein adhesive means are provided in the recesses of the hinge elements and operatively engage the respective window panels to secure the panels to the hinge elements.

3. The invention defined in claim 2 wherein the adhesive means are the exclusive means for attaching the window panels to the respective hinge elements.

4. The invention defined in claim 1 wherein the pivot elements comprise vertical pivot pins respectively mounted on and extending downwardly from the upper frame portion and mounted on and extending upwardly from the lower frame portion.

5. The invention defined in claim 4 wherein the hinge elements include upper and lower sockets that respectively receive the upper and lower pivot pins.

6. The invention defined in claim 5 wherein the upper and lower sockets of the first hinge elements are vertically offset from the sockets of the second hinge element, and the hinge elements are identical but reversed 180° about a horizontal transverse axis.

7. The invention defined in claim 1 wherein the seal member includes an elastomeric body substantially covering the inner edge of said one hinge element and a pair of lips extending along the length of the seal member and engaging the inner edge of the opposite hinge element in said closed position.

8. The invention defined in claim 1 wherein the inner edges of the hinge elements in the closed position are opposite and spaced from each other a distance less than the uncompressed thickness of the seal member so that the seal member is compressed in the closed position.

9. The invention defined in claim 1 wherein the hinge elements have flat surfaces coplanar with the inner surfaces of the window panels in the closed position of the panels.

10. The invention defined in claim 1 wherein the fore-and-aft width of the hinge element is less than ten times the thickness of the window panel.

* * * * *